July 14, 1942.  A. W. MOORE  2,289,718
GLASS CUTTER
Filed Aug. 2, 1939
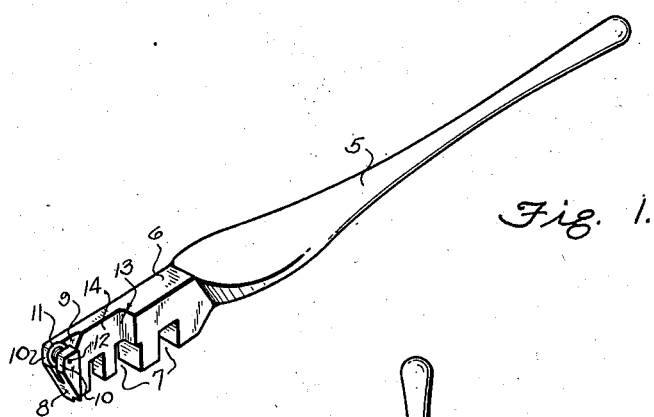
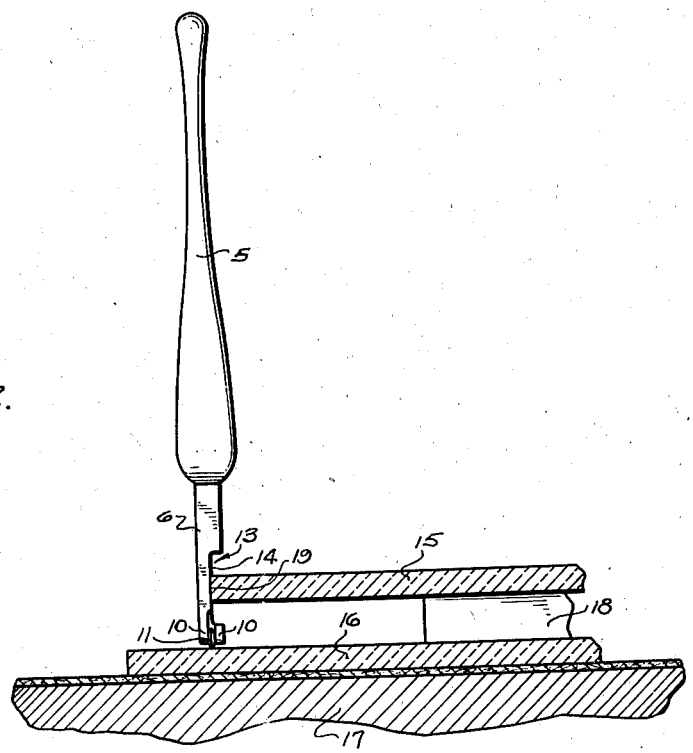
Inventor
ANDREW W. MOORE.
By Frank Fraser
Attorney Patented July 14, 1942

2,289,718

UNITED STATES PATENT OFFICE 2,289,718

GLASS CUTTER

Andrew W. Moore, Toledo, Ohio, assignor to Libbey-Owens-Ford Glass Company, Toledo, Ohio, a corporation of Ohio Application August 2, 1939, Serial No. 287,869

3 Claims. (Cl. 49—52)

The present invention relates to cutting tools in general and more particularly to an improvement in glass cutters.

The type of glass cutter with which this invention is concerned is adapted to be held in the hand of the operator and drawn by him across the sheet or plate of glass to be cut. The cutter comprises an elongated handle provided at one end with a head carrying the cutting tool which may consist either of a diamond or a rotatable steel wheel. In cutting glass sheets to a predetermined size and/or shape with this type of cutter, the said cutter is drawn across the glass, with the head thereof held firmly by the operator against a straight-edge or suitably shaped template. Heretofore, these cutters have been so constructed that when using them with a template, the template had to be made relatively smaller than the light of glass to be cut. Also, when using a straight-edge for guiding the cutters, the said straight-edge had to be set back slightly from the line of cut. In other words, when the cutter was drawn along the straight-edge or template the cutting tool was spaced slightly outwardly thereof and an allowance in the size of the template and in the settting of the straight-edge were necessary in order that the position of the cutting tool would coincide with the desired line of cut.

It is the aim of this invention to provide a hand manipulated cutter of improved construction whereby the necessity for making such an allowance in the positioning of the straight-edge or in the size of the template is obviated. According to the invention, the guiding edge of the straight-edge can be positioned directly above the desired line of cut and likewise the size of the template can be of exactly the same size as the light of glass to be cut.

Although the cutter is not limited to any specific use, it is of especial utility for use by glass jobbers and those engaged in the replacement of broken windshields and door and window lights for automotive vehicles. With the present type of cutter, when a safety glass windshield or window for instance has been cracked, the exact shape and size of the windshield or window can be accurately reproduced by simply using the cracked windshield or window as a template for cutting the new light of glass. This is due to the fact that with the novel type of cutter herein provided the template can be of the same size as the glass sheet to be cut and does not have to be relatively smaller as has been heretofore necessary. Consequently, the cracked windshield or window will serve as the template and the need for a special template is eliminated.

Other objects and advantages of the invention will become more apparent during the course of the following description, when taken in connection with the accompanying drawing.

In the drawing, wherein like numerals are employed to designate like parts throughout the same:

Fig. 1 is a perspective view of a glass cutter constructed in accordance with the invention; and Fig. 2 is an elevation of the glass cutter illustrating the manner in which it is used with a template or straight-edge.

With reference now to the drawing, 5 represents the tool handle and 6 the tool head which is preferably formed as an integral part of the handle and generally shaped to conform to the standard construction of glass cutters of this particular type. In this connection, the head may be equipped with parallel slots 7 of various dimensions for accommodating various thicknesses of glass which are to be cut by the tool. These slots are used to break the glass along the line of cut after it has been scored by the cutter. This is of course a common expedient and is carried out with glass cutters of this kind.

The outer end of the tool head 6 is beveled as at 8 and bifurcated at its upper edge to form the slotted opening 9 between the arms 10—10. Arranged within the slotted opening 9 is a rotary steel cutting wheel 11 carried by the pin 12 which is mounted in the arms 10—10. A cutting diamond may be used in place of the wheel 11 if desired.

According to the invention, the inner side of the tool head 6 is notched or recessed as at 13 and the inner wall 14 thereof is adapted to align with the cutting edge of the rotary steel cutting wheel 11 as illustrated in Fig. 2.

When using the cutter, the inner wall 14 of recess 13 constitutes a bearing surface which is adapted to engage the straight-edge or template and by which the tool is guided in its movement. The manner in which the cutter is adapted to be used is clearly shown in Fig. 2, wherein the cutter is being guided by a template 15 to score the sheet of glass 16. The glass sheet 16 is laid horizontally upon a suitable support 17 and the template 15 is spaced above the glass sheet by a suitable spacing means 18. The cutter is held in a substantially vertical position in the usual manner and is drawn across the surface of the glass sheet while being held against the edge 19 of the template. As will be seen, the bearing surface 14 of the tool head 6 is in engagement with the edge of the template and when so positioned the edge of said template is in vertical alignment and coincides with the cutting edge of the rotatable steel cutting wheel 11. Consequently, the template may be of exactly the same size as the glass sheet to be cut and, as above stated, may consist of a broken glass windshield or window which it is desired to reproduce. The cutting operation is carried out in the same manner when a straight-edge is being used to make a straight cut. That is, the cutter guiding edge of the straight edge will be positioned to coincide with the desired line or cut.

As pointed out above, this type of cutter is especially suitable for use by glass jobbers and glass replacement establishments in cutting glass sheets to the same size as windshields and door and window lights for automobiles. For instance, the template 15 may consist of a sheet of safety glass which has been cracked but which still retains its original shape. This cracked sheet of safety glass can be used as the template, and with the improved type of cutter herein provided a new sheet of safety glass can be cut to exactly the same shape and size as the old sheet. This would not be possible with the type of cutters heretofore employed, because with those cutters the template would have to be slightly smaller than the sheet to be cut to allow for the distance the cutting tool is positioned from the edge of the template. With the cutting tool positioned intermediate the side faces of the tool head, the allowance required would be approximately one-half the thickness of said head. The necessity for making such an allowance is obviated with the cutter of this invention, and in this way the replacement of safety glass in the windshields and doors and windows of automobiles will be greatly facilitated. The necessity for the jobber or replacement establishment to first make a special template for cutting the windshield or window is obviated.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. A glass cutter of the character described, comprising a handle at one end and a head at the opposite end, and a cutting tool carried by said head, the said head being formed with a bearing surface in alignment with the cutting edge of said tool and adapted to engage the edge of a guide for said cutter.

2. A glass cutter of the character described, comprising a handle at one end and a head at the opposite end, and a cutting tool carried by said head substantially intermediate the opposite side faces thereof, one side of said head being notched to form a bearing surface in alignment with the cutting edge of said tool and adapted to engage the edge of a guide for said cutter.

3. A glass cutter of the character described, comprising a handle at one end and a head at the opposite end formed integral with said handle, and a rotatable steel cutting wheel carried by said head, one side of said head being notched inwardly of said cutting wheel to form a bearing surface in alignment with the cutting edge of the said cutting wheel and adapted to engage the edge of a guide for said cutter.

ANDREW W. MOORE.